(12) United States Patent
Toni

(10) Patent No.: US 11,865,989 B2
(45) Date of Patent: *Jan. 9, 2024

(54) SEAT WITH A SIDE AIRBAG FOR A VEHICLE

(71) Applicant: FERRARI S.P.A., Modena (IT)

(72) Inventor: Fabio Toni, Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,575

(22) Filed: Apr. 4, 2023

(65) Prior Publication Data

US 2023/0322177 A1    Oct. 12, 2023

(30) Foreign Application Priority Data

Apr. 6, 2022 (IT) .................. 102022000006824

(51) Int. Cl.
*B60R 21/207* (2006.01)
*B60R 21/215* (2011.01)
(Continued)

(52) U.S. Cl.
CPC .......... *B60R 21/207* (2013.01); *B60R 21/215* (2013.01); *B60R 21/2334* (2013.01);
(Continued)

(58) Field of Classification Search
CPC ............... B60R 21/207; B60R 21/215; B60R 21/23138; B60R 21/2334; B60R 2021/23146
See application file for complete search history.

(56) References Cited

U.S. PATENT DOCUMENTS 5,762,363 A * 6/1998 Brown .................. B60R 21/207
280/730.2
5,799,971 A * 9/1998 Asada .................. B60R 21/207
280/730.2

(Continued)

FOREIGN PATENT DOCUMENTS

CN        202294664 U  *  7/2012
EP         2842802 A1  *  3/2015   .......... B60N 2/5816

OTHER PUBLICATIONS

Italian Search Report for Application No. 102022000006824; Filing Date: Apr. 6, 2022; dated Nov. 28, 2022, 7 pages.

(Continued)

*Primary Examiner* — Faye M Fleming
(74) *Attorney, Agent, or Firm* — CANTOR COLBURN LLP

(57) ABSTRACT

A seat for a vehicle and having: a frame; a bearing structure, which is mounted on the frame, is elastically deformable and is divided into a seat, a backrest and a headrest; an upholstery, which covers the bearing structure; a covering shell, which is mounted on a rear wall of the frame and has a rear wall and two side walls, which come into contact with the bearing structure; a side airbag, which is directly fixed to the frame and is arranged in a containing space laterally delimited by an outer side wall of the covering shell and is delimited at the front by an outer portion of the bearing structure; and a deflector plate, which is rigid, is directly mounted on the frame and is arranged behind the side airbag so as to be located between the side airbag and the covering shell.

9 Claims, 4 Drawing Sheets

(51) Int. Cl.
    *B60R 21/2334*     (2011.01)
    *B60R 21/231*     (2011.01)

(52) U.S. Cl.
    CPC ................... *B60R 21/23138* (2013.01); *B60R 2021/23146* (2013.01)

(56) References Cited

U.S. PATENT DOCUMENTS

| | | | |
|---|---|---|---|
| 5,967,546 A * | 10/1999 | Homier | B60R 21/207 |
| | | | 280/730.2 |
| 8,814,203 B2 * | 8/2014 | Tracht | B60R 21/23 |
| | | | 280/730.2 |
| 8,905,431 B1 | 12/2014 | Line et al. | |
| 9,707,920 B2 | 7/2017 | Sahashi | |
| 9,764,708 B2 * | 9/2017 | Garret | B60R 21/20 |
| 2014/0008898 A1 * | 1/2014 | Tracht | B60R 21/23 |
| | | | 280/730.2 |
| 2015/0283970 A1 * | 10/2015 | Line | B60R 21/207 |
| | | | 280/728.3 |
| 2019/0210551 A1 | 7/2019 | Veggian et al. | |

OTHER PUBLICATIONS

Extended European Search Report for European Patent Application No. 23166449.1; dated Aug. 28, 2023, 6 pages.

* cited by examiner

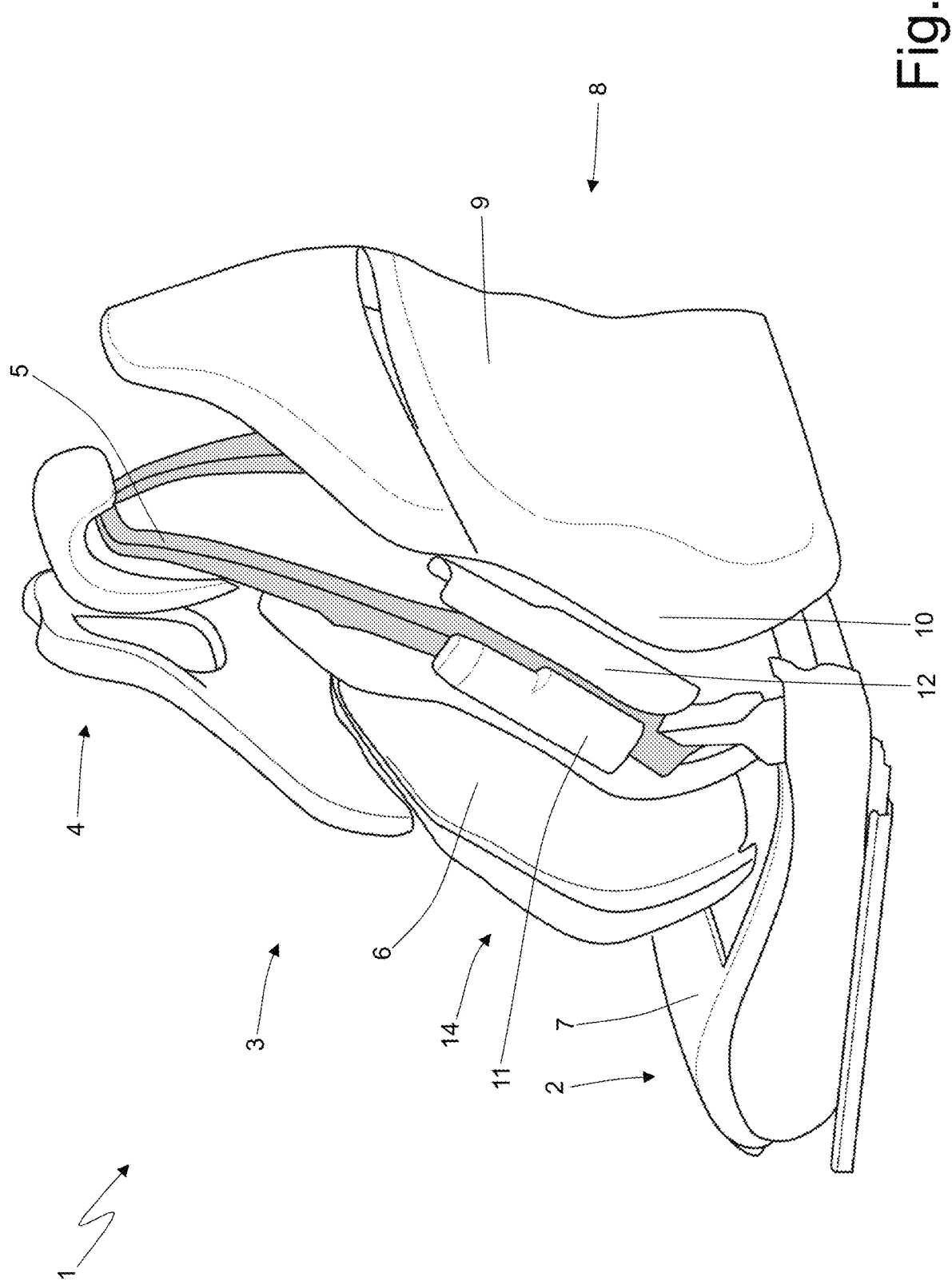

SEAT WITH A SIDE AIRBAG FOR A VEHICLE

CROSS-REFERENCE TO RELATED APPLICATIONS

This patent application claims priority from Italian patent application no. 102022000006824 filed on Apr. 6, 2022, the entire disclosure of which is incorporated herein by reference.

TECHNICAL FIELD

The invention relates to a seat with a side airbag for a vehicle.

PRIOR ART

When dealing with motor vehicles, with a percentage of approximately 20%, lateral collisions are the second most common accidents after front crashes and take place at crossroads, when a driver does not give way, or when a vehicle goes off the road and hits the side against a post, a tree or other objects. In order to reduce the consequences of lateral collisions, side airbags have been introduced so as to protect the trunk and the head of the vehicle passengers and constitute an important innovation in motor vehicle passive safety. For the driver and the front passenger, the side airbags are usually accommodated in the backrests of the front seats so that they always are in the right position to protect the upper part of the body; on the other hand, for rear passengers, the side airbags are usually accommodated in the panels of the doors.

From a constructive point of view, a seat comprises a frame, which is fixed to the floorboard of the vehicle, a bearing structure (typically made of polyurethane foam), which is mounted on the frame and is elastically yielding, and an upholstery, which covers the bearing structure and makes up the aesthetic and tactile interface to the outside (the upholstery can be made of fabric or leather). The bearing structure and the upholstery are currently pre-weakened along one or more guided breaking lines arranged in the area of the side airbag; by so doing, when, in case of impact, the side airbag is inflated, the side airbag breaks the bearing structure and the upholstery along the guided breaking lines, thus coming out of the seat in order to place itself between the occupant of the seat and the side walls of the passenger compartment.

U.S. Pat. No. 8,905,431B1 discloses a seat provided with a side airbag.

DESCRIPTION OF THE INVENTION

The object of the invention is to provide a seat with a side airbag for a vehicle, which is capable of increasing the safety of the passengers of the vehicle in case of lateral collision.

According to the invention, there is provided a seat with a side airbag for a vehicle as claimed in the appended claims.

The appended claims describe preferred embodiments of the invention and form an integral part of the description.

BRIEF DESCRIPTION OF THE DRAWINGS

The invention will now be described with reference to the accompanying drawings showing a non-limiting embodiment thereof, wherein:

FIG. 4 is an exploded perspective view of the seat of FIG. 1.

PREFERRED EMBODIMENTS OF THE INVENTION

Figure 1:
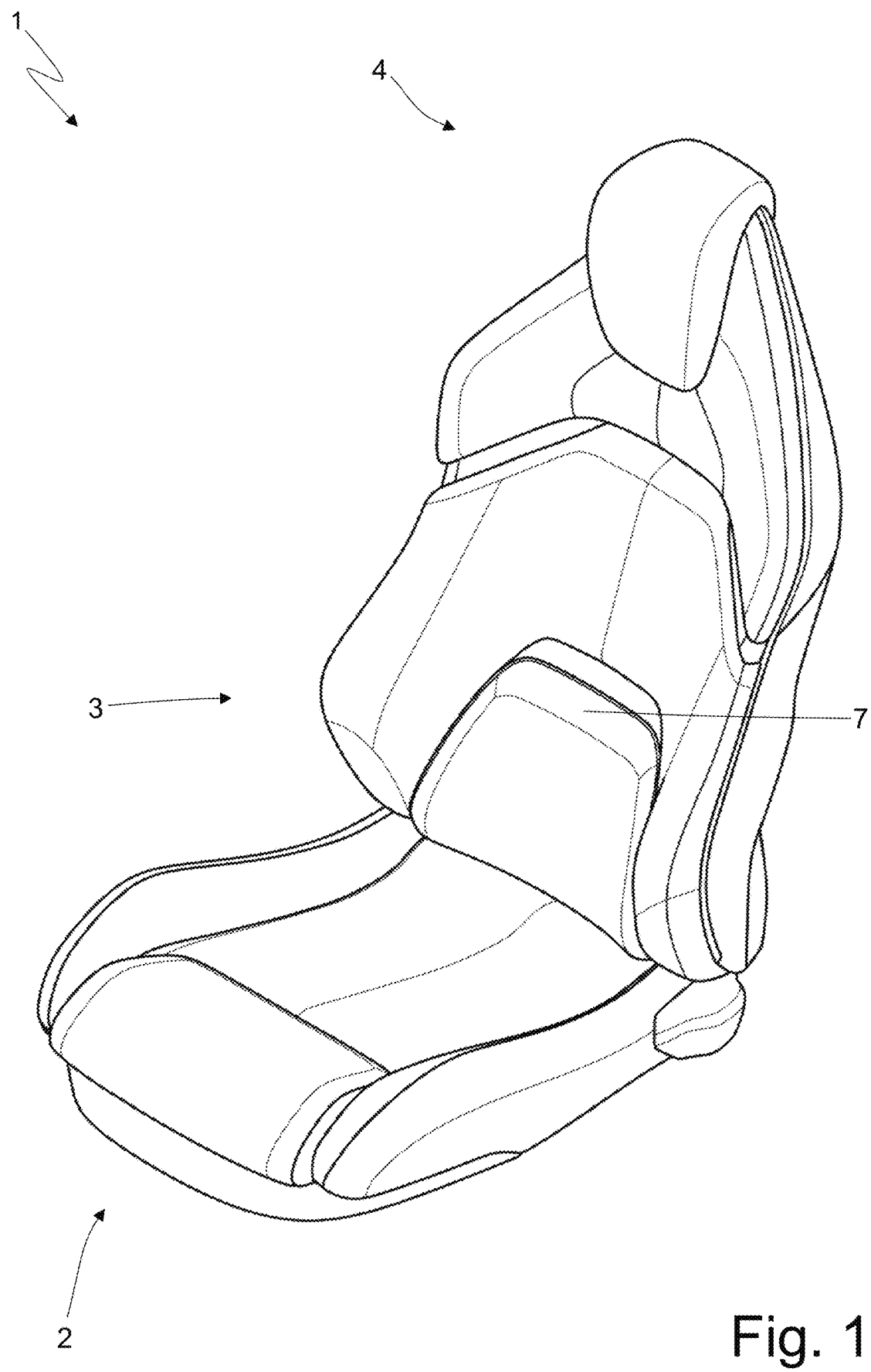
FIG. 1 is a perspective view of a seat according to the invention.
Figure 2:
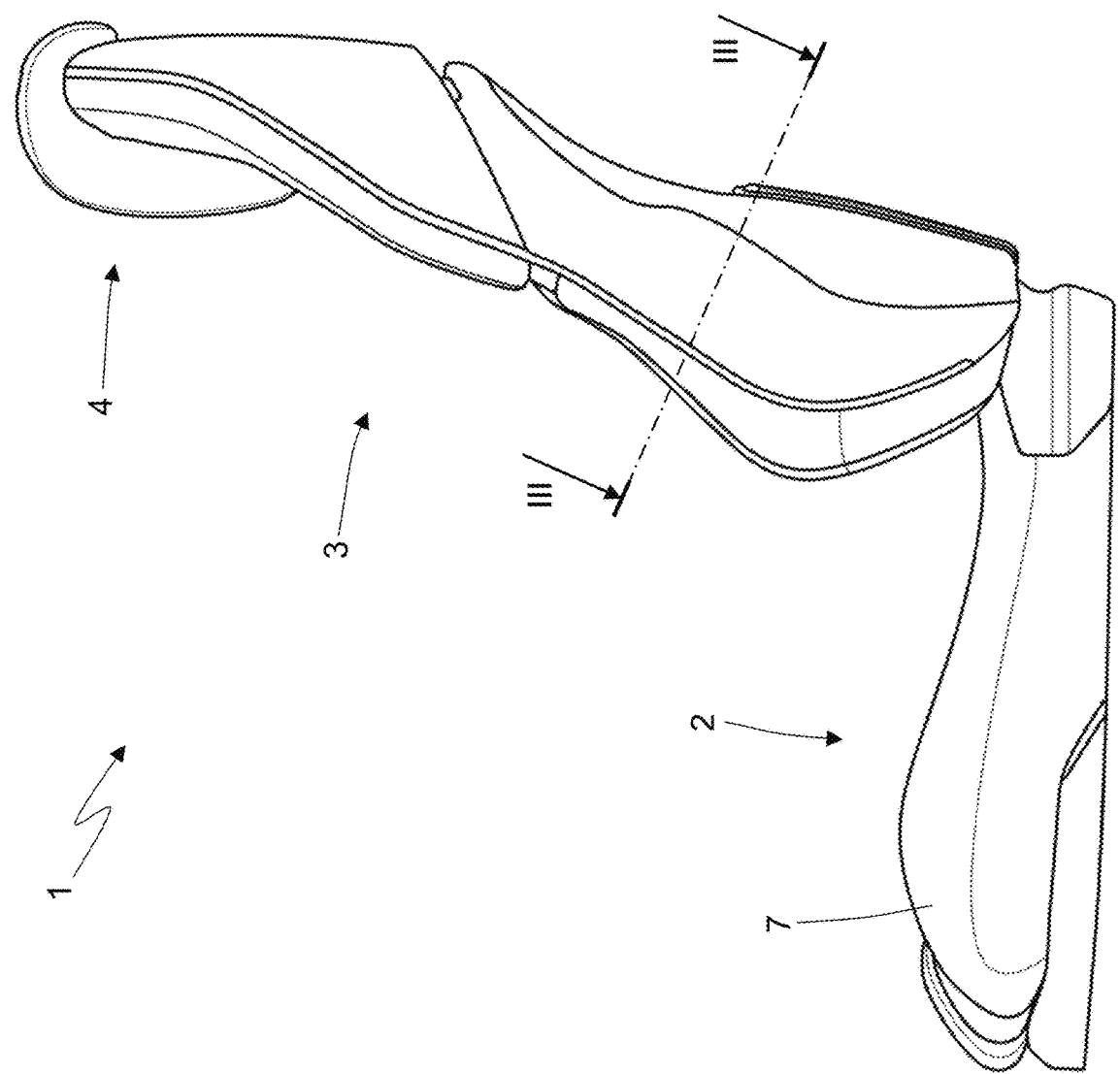
FIG. 2 is a side view of the seat of FIG. 1.

In FIG. 1, number 1 indicates, as a whole, a seat for a vehicle.

The seat 1 consists of a seat cushion 2 having a substantially horizontal arrangement and of a backrest 3 having a substantially vertical arrangement; together, the seat cushion 2 and the backrest 3 give the seat 1 an "L" shape. The backrest 3 ends, at the top, with a headrest 4, which is included in the backrest 3 itself (namely, forms one single indivisible body with the backrest 3).

From a constructive point of view and according to FIG. 4, each seat 1 comprises a frame 5 (typically made of metal or composite material), which is fixed to the floorboard of the vehicle, a bearing structure 6 (typically made of polyurethane foam), which is mounted on the frame 5 and is elastically deformable (yielding) so as to elastically deform following the thrust of a body of an occupant of the seat 1, and an upholstery 7, which covers the bearing structure 6 and makes up the aesthetic and tactile interface to the outside (the upholstery 7 can be made of fabric or leather).

Furthermore, the seat 1 comprises a (rear) covering shell (panel) 8, which is made of a plastic material (alternatively, it could be made of a composite material) and is mounted on the rear part of the frame 5 so as to make up the rear wall of the seat 1. In particular, the covering shell 8 has a rear wall 9 and two side walls 10 (namely, flanks), which come into contact with the bearing structure 6 covered by the upholstery 7.

According to FIG. 4, the seat 1 comprises a side airbag 11, which is directly fixed to the frame 5 and, in case of collision, inflates a cushion, which substantially expands longitudinally in order to place itself between the occupant of the seat 1 and the side walls of the passenger compartment. A deflector plate 12 is directly mounted on the frame 5, is arranged behind the side airbag 11 (namely, is arranged between the side airbag 11 and the covering shell 8), is rigid and is sufficiently sturdy (resistant) not to break or deform due to the thrust of the expansion of the cushion of the side airbag 11; namely, the deflector plate 12 is configured not to be subjected to any kind of deformation following the expansion of the cushion of the side airbag 11.

According to a preferred embodiment, the deflector plate 12 has the shape of a "U" facing the front, namely facing the lateral airbag 11. The "U"-shape of the deflector plate 12 is asymmetric, as it is more extended on the outside; namely, an outer side appendage of the deflector plate 12 extends more towards the front (i.e. is longer in a longitudinal direction) than an inner side appendage of the deflector plate 12.

The function of the deflector plate 12 is that of guiding the expansion of the cushion of the side airbag 11 so that the cushion expands towards the front (i.e. towards the occupant of the seat 1) and does not expand towards the rear (namely, towards the covering shell 8). From another point of view, the deflector plate 12 "protects" the covering shell 8 from the expansion of the cushion of the side airbag 11, thus preventing the cushion from expanding towards (against) the covering shell 8, hence forcing the cushion to expand towards the front (i.e. towards the occupant of the seat 1).

The deflector plate 12 is made of a metal material, for it has to have a relatively high mechanical resistance; alternatively, in order to reduce its weight, the deflector plate 12 could be made of a composite material.

Figure 3:
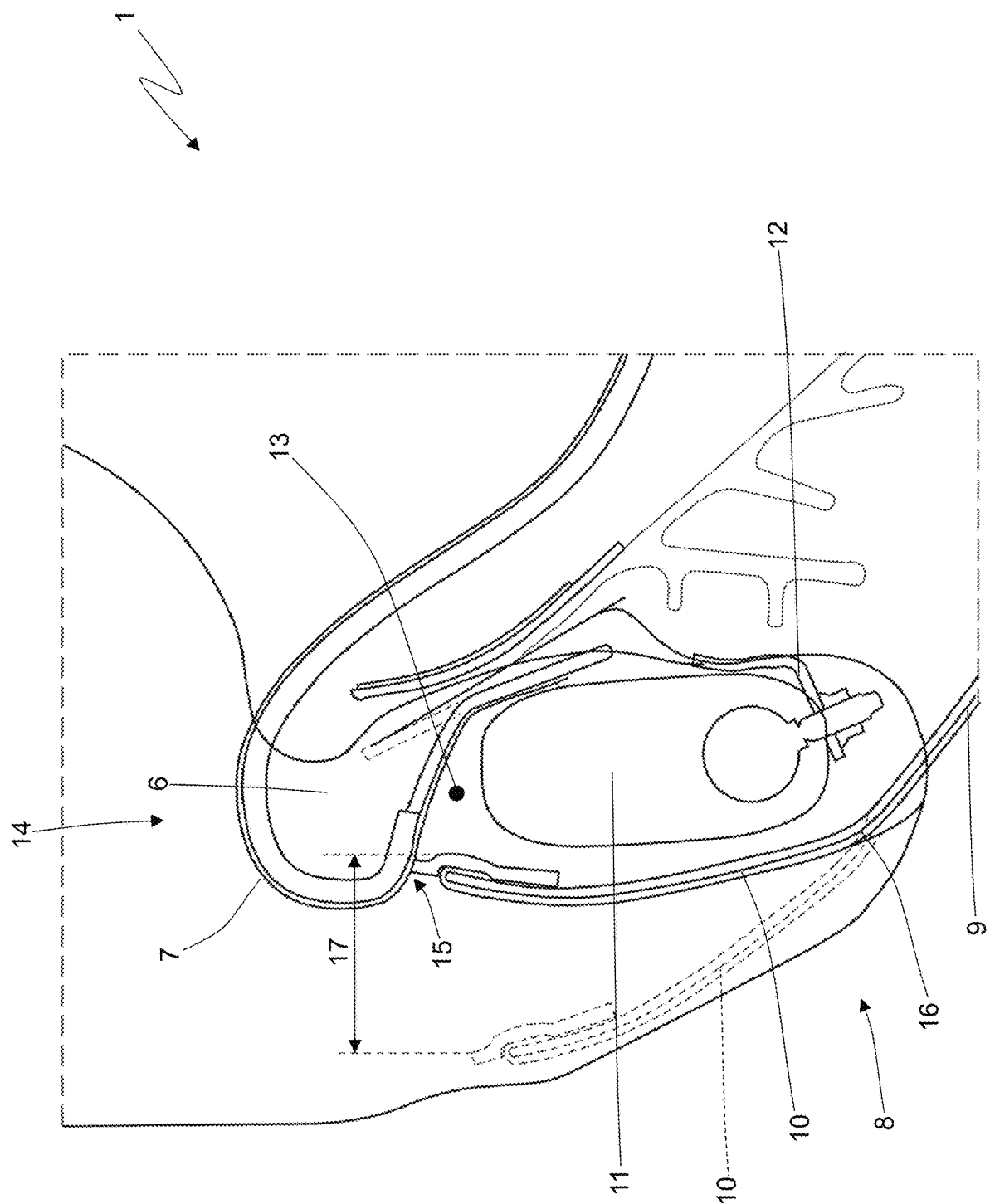
FIG. 3 is a cross-section view according to line III-III of part of a backrest of the seat of FIG. 1.

According to FIG. 3, the side airbag 11 is arranged (enclosed) in a containing space (volume, chamber) 13, which is laterally delimited by an outer side wall 10 (namely, facing towards the outside of the vehicle where the seat 1 is installed) of the covering shell 8 and is frontally delimited by an outer (side) portion 14 of the bearing structure 6 (at least partially) covered by the upholstery 7; in this way, a front wall of the side airbag 11 directly faces, with no elements between them, a rear wall of the outer portion 14 of the bearing structure 6, namely the front wall of the side airbag 11 "watches" the rear wall of the outer portion 14 of the bearing structure 6 with no intermediate elements between them. A connection 15 between an end of the outer side wall 10 of the covering shell 8 and the outer portion 14 of the bearing structure 6 has a calibrated and relatively weak mechanical resistance so as to break due to the thrust of the expansion of the cushion of the side airbag 11, thus creating a passage opening 17 between the end of the outer side wall 10 of the covering shell 8 and the outer portion 14 of the bearing structure 6; furthermore, the outer side wall 10 of the covering shell 8 has a pre-weakened hinge line 16, along which the outer side wall 10 preferentially tends to rotate when it is mechanically stressed by the expansion of the cushion of the side airbag 11.

In case of expansion of the cushion of the side airbag 11 (obviously, following a collision), the cushion of the side airbag 11 (also pushed by the deflector plate 12) frontally and directly presses against the outer portion 14 of the bearing structure 6 and laterally presses against the outer side wall 10 of the covering shell 8, thus causing two effects: the outer portion 14 of the bearing structure 6 deforms forwards due to the thrust of the expansion of the cushion of the side airbag 11, which directly presses against the outer portion 14 of the bearing structure 6, while the outer side wall 10 of the covering shell 8 detaches itself from the outer portion 14 of the bearing structure 6 (as mentioned above, their connection 15 has a calibrated and relatively weak mechanical resistance so as to break due to the thrust of the expansion of the cushion of the side airbag 11) and the outer portion 14 of the bearing structure 6 rotates outwards around the pre-weakened hinge line 16 so as to open the passage opening 17, through which the cushion of the side airbag 11 comes out of the seat 1 and protrudes forward in order to place itself between the occupant of the seat 1 and the side walls of the passenger compartment.

In other words, the outer (side) portion 14 of the bearing structure 6 is configured not to break, but to deform forward due to the thrust of the expansion of the cushion of the side airbag 11, which directly presses against the outer portion 14 of the bearing structure 6, thus pushing the outer portion 14 of the bearing structure 6 forward. Therefore, the outer (side) portion 14 of the bearing structure 6 is not broken by the expansion of the cushion of the side airbag 11, but is only deformed (namely, is pushed forward towards the inside and, hence, towards the occupant of the seat 1) by the expansion of the cushion of the side airbag 11; in this way, the outer (side) portion 14 of the bearing structure 6 protects the occupant of the seat 1 from possible pieces (generally made of plastic) present inside the seat 1, which could get broken and be thrown towards the passenger by the expansion of the cushion of the side airbag 11.

The embodiments described herein can be combined with one another, without for this reason going beyond the scope of protection of the invention.

The seat 1 described above has numerous advantages. First of all, the seat 5 disclosed above is capable of increasing the safety of the passengers of the vehicle in case of lateral collision. This result is obtained thanks to the fact that the cushion of the side airbag 11 expands in an ideal manner, namely by being basically projected forward in order to place itself, in its entirety, between the occupant of the seat 1 and the side walls of the passenger compartment. This result is also obtained thanks to the fact that the bearing structure 6 of the seat 1 is not broken by the expansion of the cushion of the side airbag 11 and can provide a greater protection for the occupant of the seat 1.

Finally, the seat 5 described above is simple and economic to be manufactured.

LIST OF THE REFERENCE NUMBERS OF THE FIGURES 1 seat
2 seat cushion
3 backrest
4 headrest
5 frame
6 bearing structure
7 upholstery
8 covering shell
9 rear wall
10 side walls
11 side airbag
12 deflector plate
13 containing space
14 outer portion
15 connection
16 hinge line
17 passage opening

The invention claimed is:

1. A seat (1) for a vehicle and comprising:
a frame (5);
a bearing structure (6), which is mounted on the frame (5), is elastically deformable so as to elastically deform following the thrust of a body of an occupant of the seat (1) and is divided into a seat (2), a backrest (3) and a headrest (4);
an upholstery (7), which covers the bearing structure (16) and makes up an aesthetic and tactile interface to the outside;
a covering shell (8), which is mounted on a rear wall of the frame (5) and has a rear wall (9) and two side walls (10), which come into contact with the bearing structure (6);
a side airbag (11), which is provided with an inflatable cushion, is directly fixed to the frame (5) and is arranged in a containing space (13) laterally delimited by an outer side wall (10) of the covering shell (8); and
a deflector plate (12), which is rigid, is directly mounted on the frame (5) and is arranged behind the side airbag (11) so as to be located between the side airbag (11) and the covering shell (8);
wherein the containing space (13) is directly delimited at the front by an outer portion (14) of the bearing structure (6) so that a front wall of the side airbag (11) directly faces, with no elements between them, a rear wall of the outer portion (14) of the bearing structure (6);

wherein a connection (15) between an end of an outer side wall (10) of the covering shell (8) and the outer portion (14) of the bearing structure (6) has a calibrated mechanical resistance so as to break due to the thrust of the expansion of the cushion of the side airbag (11), thus creating a passage opening (17), through which the cushion comes out of the seat (1), between the end of the outer side wall (10) of the covering shell (8) and the outer portion (14) of the bearing structure (6); and wherein the outer portion (14) of the bearing structure (6) is configured not to break, but to deform forward due to the thrust of the expansion of the cushion of the side airbag (11), which directly presses against the outer portion (14) of the bearing structure (6).

2. The seat (1) according to claim 1, wherein the deflector plate (12) is sufficiently sturdy not to break and deform due to the thrust of the expansion of the cushion of the side airbag (11).

3. The seat (1) according to claim 1, wherein the deflector plate (12) has the shape of a "U" facing the front, namely facing the lateral airbag (11).

4. The seat (1) according to claim 3, wherein an outer side appendage of the deflector plate (12) extends more towards the front than an inner side appendage of the deflector plate (12).

5. The seat (1) according to claim 1, wherein the deflector plate (12) is designed to guide the expansion of the cushion of the side airbag (11) so that the cushion expands towards the front and does not expand towards the back.

6. The seat (1) according to claim 1, wherein the deflector plate (12) is designed to protect the rear wall (9) of the covering shell (8) from the expansion of the cushion of the side airbag (11).

7. The seat (1) according to claim 1, wherein the deflector plate (12) is configured not to be subjected to any kind of deformation following the expansion of the cushion of the side airbag (11).

8. The seat (1) according to claim 1, wherein an outer side wall (10) of the covering shell (8) has a pre-weakened hinge line (16), along which the outer side wall (10) preferentially tends to rotate when it is pushed by the expansion of a cushion of the side airbag (11).

9. The seat (1) according to claim 1, wherein the cushion of the side airbag (11) is configured to frontally press against the outer portion (14) of the bearing structure (6) and to laterally press against the outer side wall (10) of the covering shell (8), thus causing two effects: the outer portion (14) of the bearing structure (6) deforms forward due to the thrust of the expansion of the cushion of the side airbag (11), whereas the outer side wall (10) of the covering shell (8) detaches itself from the outer portion (14) of the bearing structure (6) and rotates outwards around a pre-weakened hinge line (16) so as to open the passage opening (17), through which the cushion of the side airbag (11) comes out of the seat (1) and protrudes forward.

* * * * *